(12) United States Patent
Heberling

(10) Patent No.: X8751
(45) Date of Patent: Apr. 8, 1835

(54) THRASHING MACHINE

(76) Inventor: Henry Heberling

Henry Heberling. Shortcreek Township Ohio
Letters Patent

The schedule referred to in these Letters Patent and making part of the same containing a description in the words of the said Henry Heberling himself of his improvement in the Machine for thrashing grain To all to whom these presents shall come. Be it Known that I Henry Heberling of Short creek Township in the County of Harrison & State of Ohio have invented a new and useful improvement in the machine for thrashing Grain, and that the following is a full and exact description of the construction and operation of the said Machine as invented or improved by me. This machine consists of the following principal parts viz. 1st the frame 2nd the thrashing Cylinder. 3d The concave. 4th the feeding board.
1st The frame may be made of any convenient size and strength adapted to the Machinery to be constructed thereon by morticing and tenoning together four posts to the side and end pieces, & rabbeting the side boards into the posts to receive the concave
2nd The thrashing Cylinder is constructed by first making an axle about one and a half inches in diameter with two wood or metal heads. one for each end. If made of Wood they must be plated with iron. if of metal there may be eight holes drilled through each rim through which the staves may be bolted on with iron bolts for the convenience of turning off the cylinder. The diameter of the rings may be about thirteen inches. the Staves are next prepared of the length of the inten ded cylinder. and of such a thickness as will allow the cylinder when finished to be about nineteen inches in diameter. The teeth are made of wrought iron half an inch square and swedged on the face and left square on the back tapering from full three eighths of an inch at the bottom to about one quarter of an inch at the outer end. and rather broad extending back that they may not bend. They should project from the surface about two and a quarter inches when inserted and be about one and one eighth of an inch apart from center to center, and clinched. bending back or declining from the grain rather than otherwise, The number of teeth in a cylinder for a four horse power may be about one hundred and ninety two and must be so inserted as to save the timbers as much as possible and intersect
reciprocally those in the concave herein after described. 3^d The concave must be
made of the same curvature as the extremity of the teeth in the cylinder and is to
contain three solid rows and two half rows of teeth of the same dimensions and
same distances from center to center as those in the cylinder. These are to be inser
ted and riveted in five round wrought iron rollers about one inch in diameter
with the holes drilled for this purpose. The two half rows or half filled rollers must
go in the front of the concave. these rollers must be sunk in the concave untill they
drop parallel with the surface of the concave and form a part of it. The surface of the
concave immediately below or behind the rollers must be cut away until the
teeth may be permitted to lie or spring down flat to the bed in the event of any
hard substance or large bound sheaf of grain falling accidentally into the machine
so that after such hard substance or sheaf passes through the rollers being sus
tained by springs of a proper strength instantly raise the teeth to their proper po-
sition. These springs act on one end of each roller after it passes through the
side board of the machine, it extending also far enough into the side board on
the opposite side to make it completety strong; each roller may also be supported
in the middle if thought proper. Steel wire or any kind of springs may be
used that may meet the choice and convenience of the builder. It may however be found
convenient to put them on the side opposite to the wheels and to place them above
connecting them to short levers slipped on the end of each roller the ends being made
square for that purpose. The teeth in the concave should decline from the grain
that it may not be detained too long in getting through. and this may be regula
ted by inserting small pins above the levers. the concave should be placed rather
in front of the cylinder and may extend three or four inches past the center be
neath forming about one fourth of the circumference of the cylinder. As the concave
and cylinder both should be covered with sheet iron care must be taken in put
ting it on especially on the concave that above each roller should be so carved
as to run down between the teeth whilst that below should not interfere with the
springing down of the teeth — 4th The feeding board is an inclined plane placed
in front of the cylinder and even with the top of the concave — Operation. —
The grain to be thrashed is introduced into the machine along the feeding board. it
is conveyed by the cylinder to the concave bed where it is rubbed out between the teeth when grain and Straw both pass out together the Straw remaining completely on top
By means of these Rollers many accidents detrimental to the machine and
dangerous to the Thrasher will be avoided and none of that waste of power caus-
ed by a flexible cylinder (its being continually more or less out of Balance) can
occur. What I claim as my invention and not previously known in the
above described machine is particularly the Spring Rollers and their application to
a concave for thrashing grain – In testimony that the above is a full clear and ex
act description of the construction and mode of operation of my improvement as
invented or improved by me I have hereunto set my hand this second day
of April in the year Eighteen hundred and thirty five Witnesses
Henry Stone
Robt Clarke Henry Heberling Exd
C.R.J.W.